3,059,442
METHOD OF PREPARING FROZEN FOOD FOR MARKET

Herbert B. Ellis, Pasadena, Calif., assignor to Reliquefier Corporation, New York, N.Y., a corporation of New York
No Drawing. Filed May 3, 1961, Ser. No. 107,328
2 Claims. (Cl. 62—64)

My invention relates to improvements in method of preparing frozen food and the like for market.

It is known that if meat and some other foods are frozen to below zero degrees F. temperatures and are thereafter exposed to ambient air, the food will become grey in color as a result of frosting, that is, deposit of frozen moisture from air upon the cold food surface. This results in an unsightly appearance and reduces the salability of the food.

It has also been discovered that if after such frosting has occurred, the food is exposed to a suitable heat soruce, the frost ice crystals may be melted to form a generally continuous water film about the food which may thereafter be frozen to define a continuous transparent glaze of water ice through which the original meat color is visible, thus returning the color of the meat to natural and greatly promoting its salability while at the same time enclosing it in an ice envelope which retards vapor migration and desiccation of the food.

This phenomenon and this solution of the problem is especially important in connection with meat but it is also of value in the treatment of other foods and perishable materials whose value depends to some extent upon appearance and preservation of natural color.

The food may be frozen in many different ways. It may be warmed to melt the frost crystals and form a water film in many different ways and the film may be frozen to form a transparent ice envelope in many different ways.

For example—if meat is frozen by immersion in a a liquid nitrogen bath at atmospheric pressure and −320 degrees F., it may be reduced in temperature to far below zero degrees F. When the meat is withdrawn from the bath, it will be exposed first to the dry cold gaseous nitrogen evaporated from the bath by the heat of the meat but when the meat is withdrawn from the nitrogen gas atmosphere and is exposed to ambient moisture laden air, the moisture in the air is condensed with frost formation and the deleterious grey color appears.

If this grey meat is subjected to heat sufficient to melt the frost crystals, a film of water will be formed on the meat. This heat may take the form of hot air, infrared rays or even the immersion of the heat in a water bath so long as the time of heating is just sufficient to melt the frost crystals and form a water coating, no harm is done to the meat and because of the low thermal conductivity of the meat, ltitle if any change in temperature will occur.

Once the water film has been formed, that film must now be frozen. A convenient way to freeze it is to let the cold in the meat freeze the water film.

If desired, the meat with its water film may be exposed to a cold air blast or kept in a cold chamber where the temperatures are well below freezing. It makes no difference how this is done. The point is that varying successive steps must be made. First, the meat must be frozen, preferably to a temperature well below freezing. Second, it must be exposed to gas, such as air, with sufficient moisture content so that a coating of crystals is formed. Third, that frost coating must actually be melted to form a continuous or at least substantially continuous thin, transparent film or envelope of ice through which the natural color of the meat may be seen.

If the meat or other food, as frequently is the case wrapped in a transparent wrapper, the treatment will be the same but in this case, the frost formation, the water film and the ice may be found on the outside of the wrapper rather than on the surface of the food. In the case where there is frost on the inside or outside of the wrapper, the warming treatment must be sufficient to melt such frost in addition to any that may be on the surface of the food product.

While my invention is especially well adapted to treatment of meat and especially packaged meat, it is also adaptable to other foodstuffs packaged or unpackaged, to the packages containing the foodstuffs or to any other packages containing perishable material or to any other perishable material where it is important to enhance its appearance by bringing out the natural color as contrasted with the grey, unsightly appearance resulting from the formation of the water crystals. For convenience in my claims I have used the term "food" in the broadest sense, namely— edible or other perishable products and their wrappers where appearance and natural color must be visible to the consumer.

I claim:

1. The method of preparing food for market which consists in immersing it in a bath of liquid nitrogen at atmospheric pressure until it is frozen to a desired low temperature far below zero degrees F., then withdrawing the food from the bath and exposing it to ambient moisture laden gas, the temperature of which is above the temperature of the food, until an opaque coating of frost has been deposited upon and covers the entire surface of the food by condensation of the water vapor in the gas, then applying heat to the entire frost coating to melt it until the surface of the food is coated with a substantially continuous moisture film, resulting only from the melting of the frost, then freezing the film of moisture by heat exchange with the frozen food to form a thin continuous transparent water ice glaze covering the entire surface of the food.

2. The method of preparing food for market which consists in cooling it while out of contact with moisture laden air until it is frozen to a desired low temperature far below zero degrees F., then exposing it to ambient moisture laden gas, the temperature of which is above the temperature of the food, until an opaque coating of frost has been deposited upon and covers the entire surface of the food by condensation of the water vapor in the gas, then applying heat to the entire frost coating to melt it until the surface of the food is coated with a substantially continuous moisture film, resulting only from the melting of the frost, then freezing the film of moisture to form a thin continuous transparent water ice glaze covering the entire surface of the food.

References Cited in the file of this patent
UNITED STATES PATENTS

| | | |
|---|---|---|
| 2,166,113 | Bedford | July 18, 1939 |
| 2,329,472 | Koonz | Sept. 14, 1943 |
| 2,339,300 | Taylor | Jan. 18, 1944 |